Aug. 23, 1927.  1,639,987
R. C. COUPLAND
ELECTRICAL CONTROL SYSTEM
Filed May 13, 1926   11 Sheets-Sheet 1
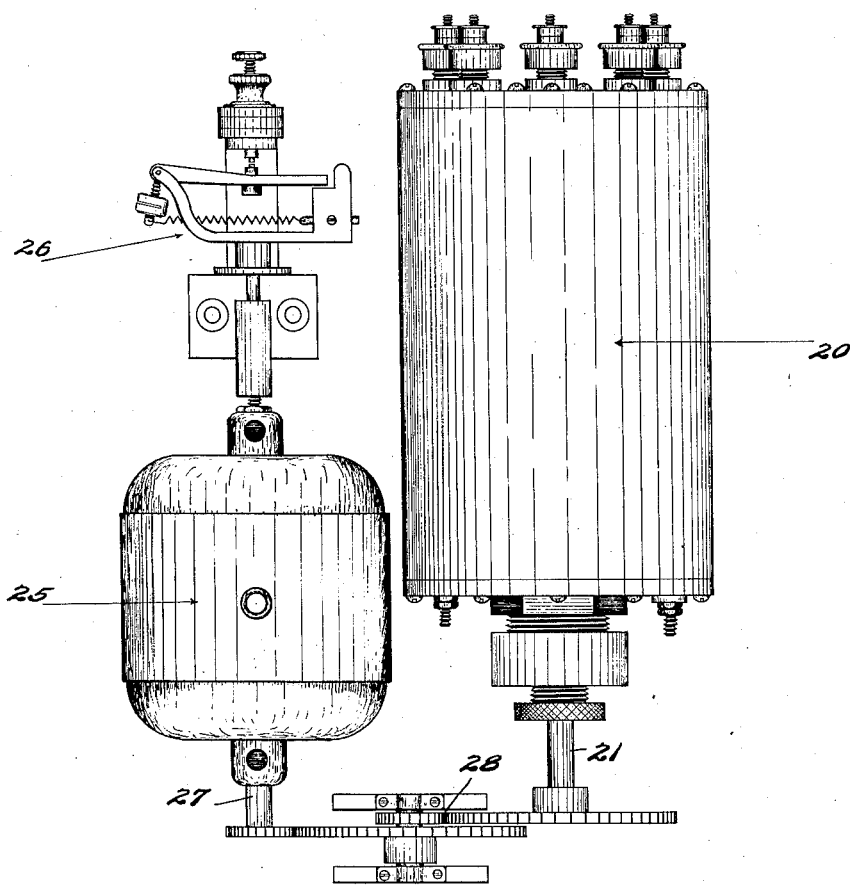
Witnesses:
Inventor:
Richard C. Coupland Aug. 23, 1927.
R. C. COUPLAND
1,639,987
ELECTRICAL CONTROL SYSTEM
Filed May 13, 1926
11 Sheets-Sheet 2
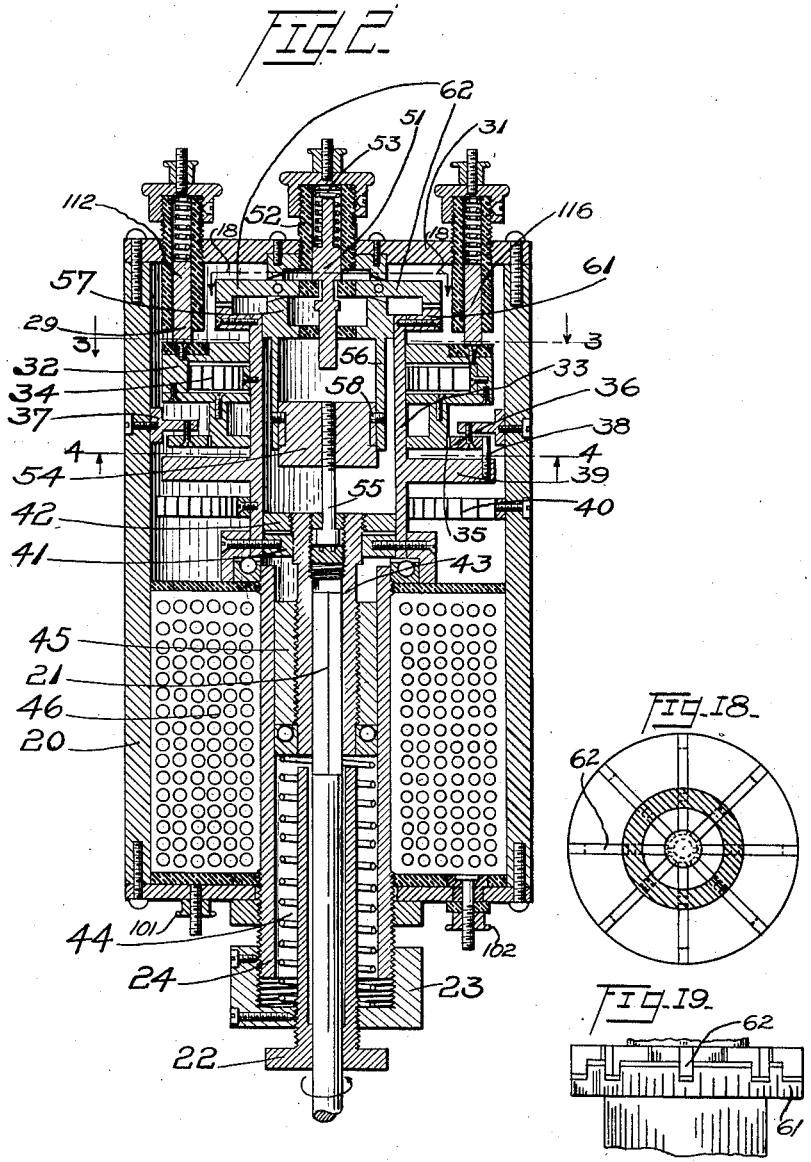

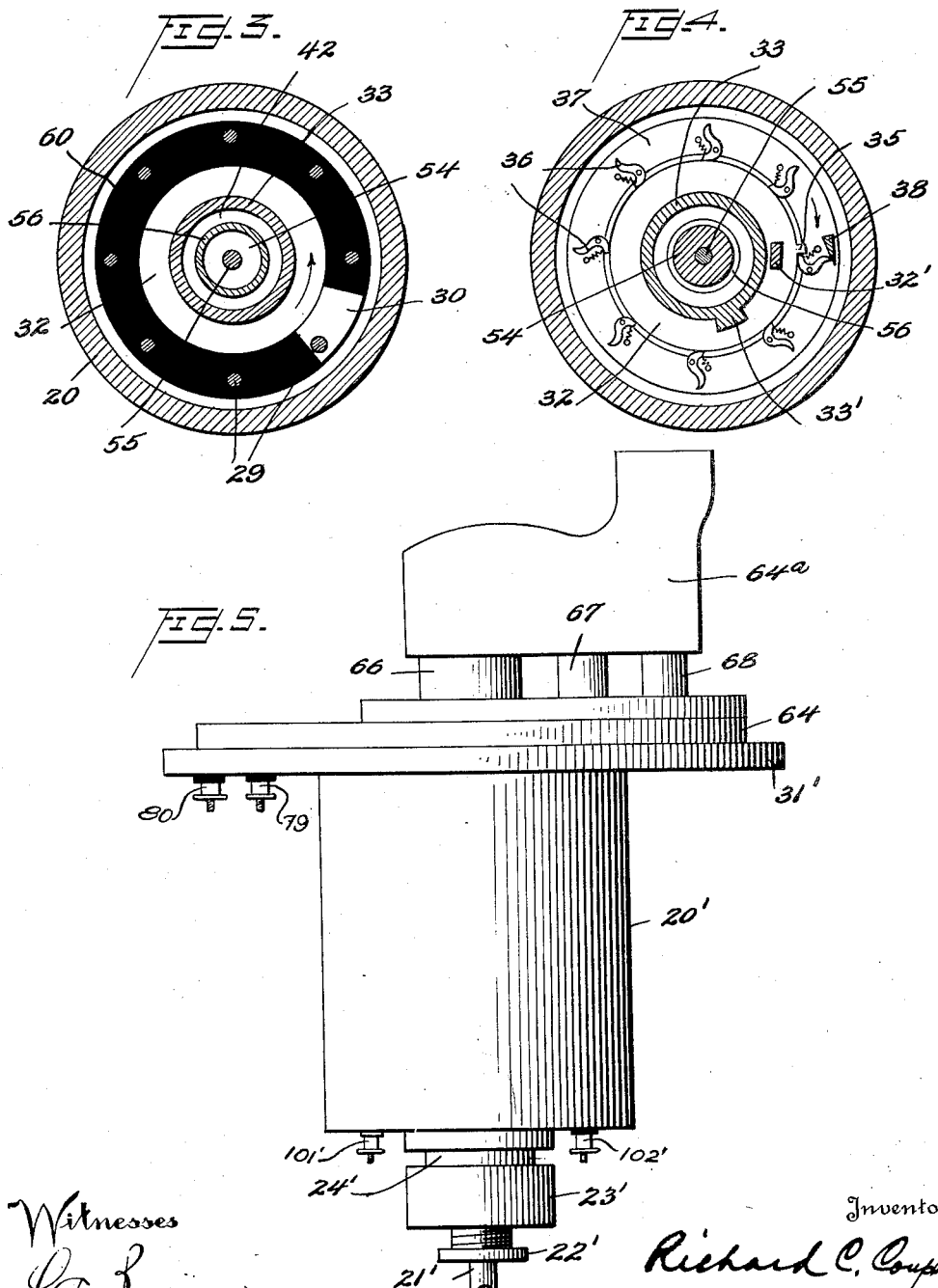

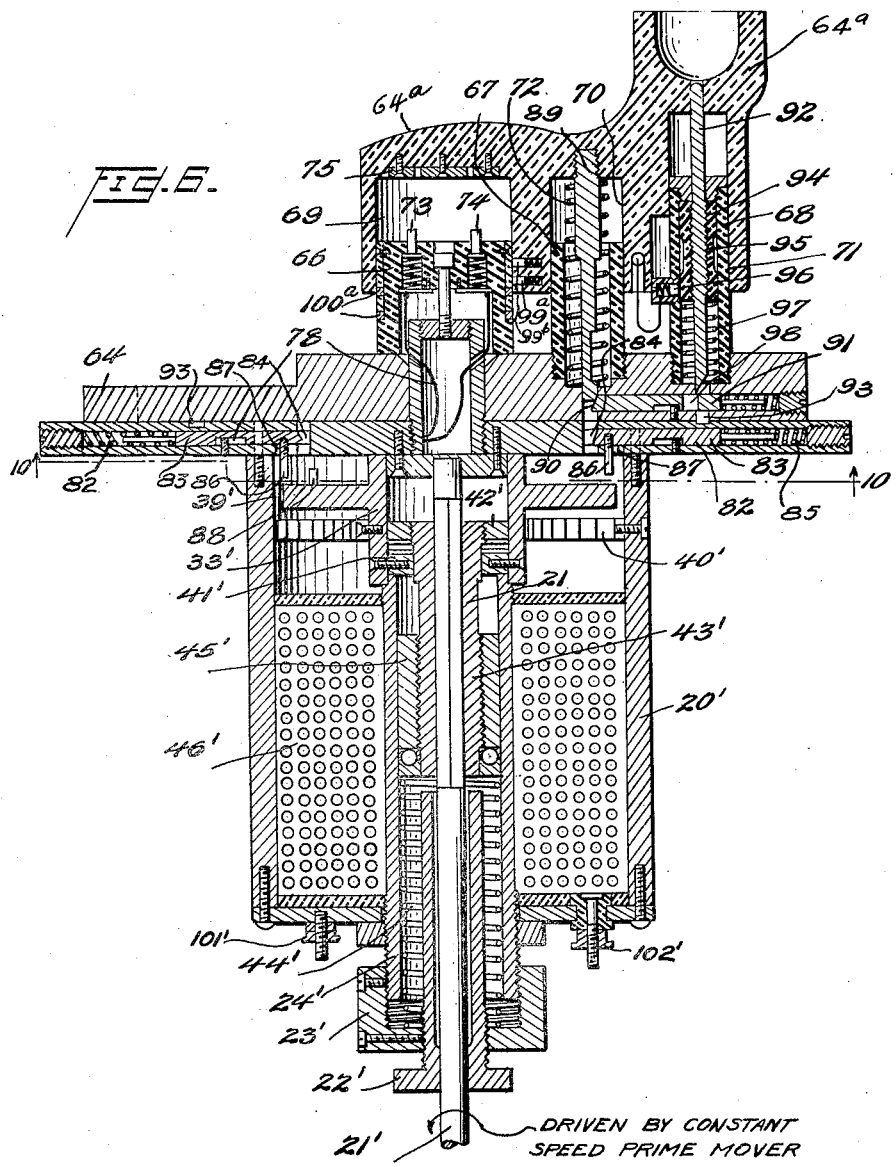

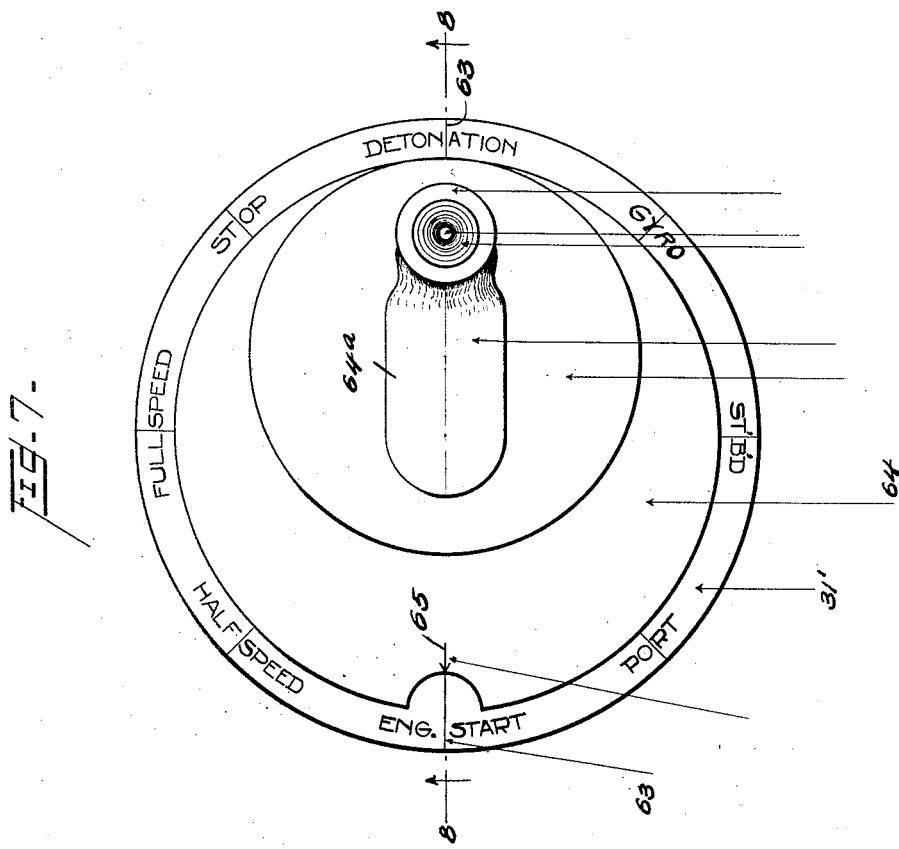

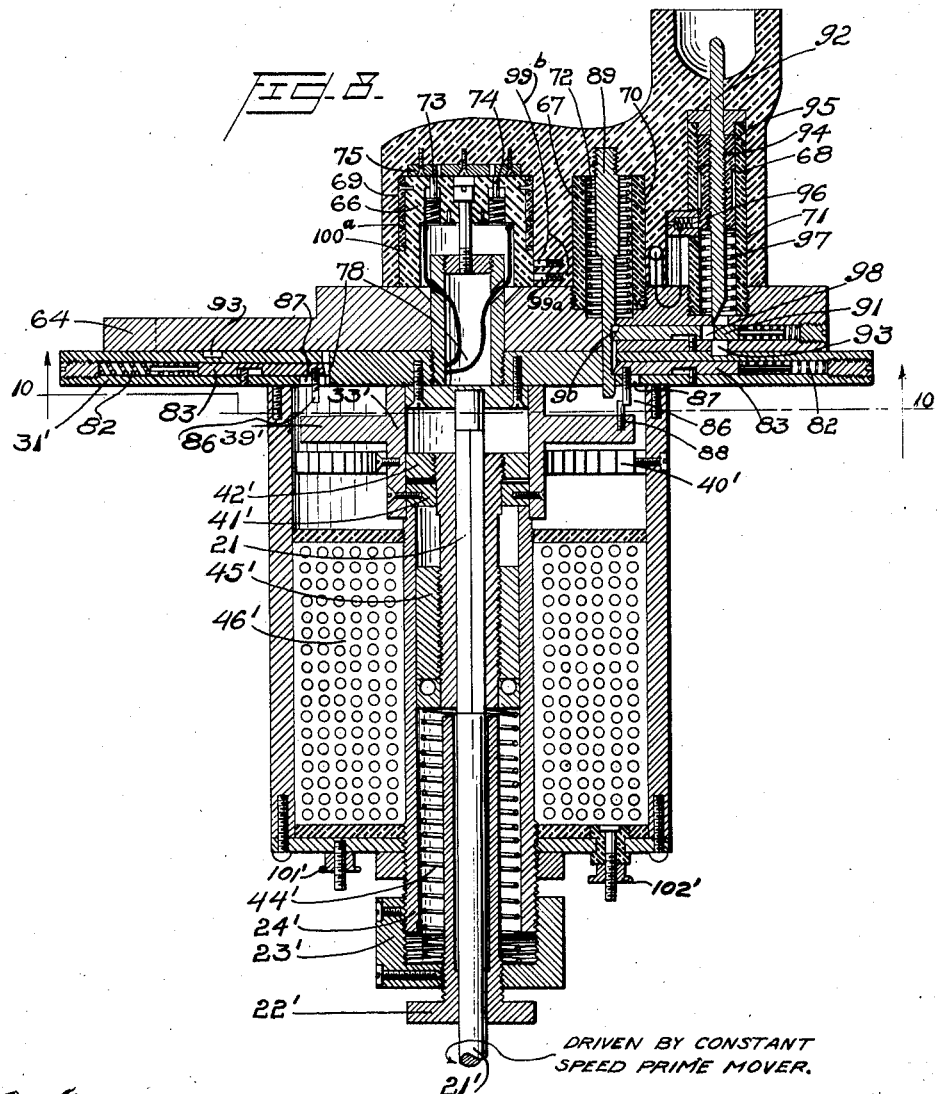

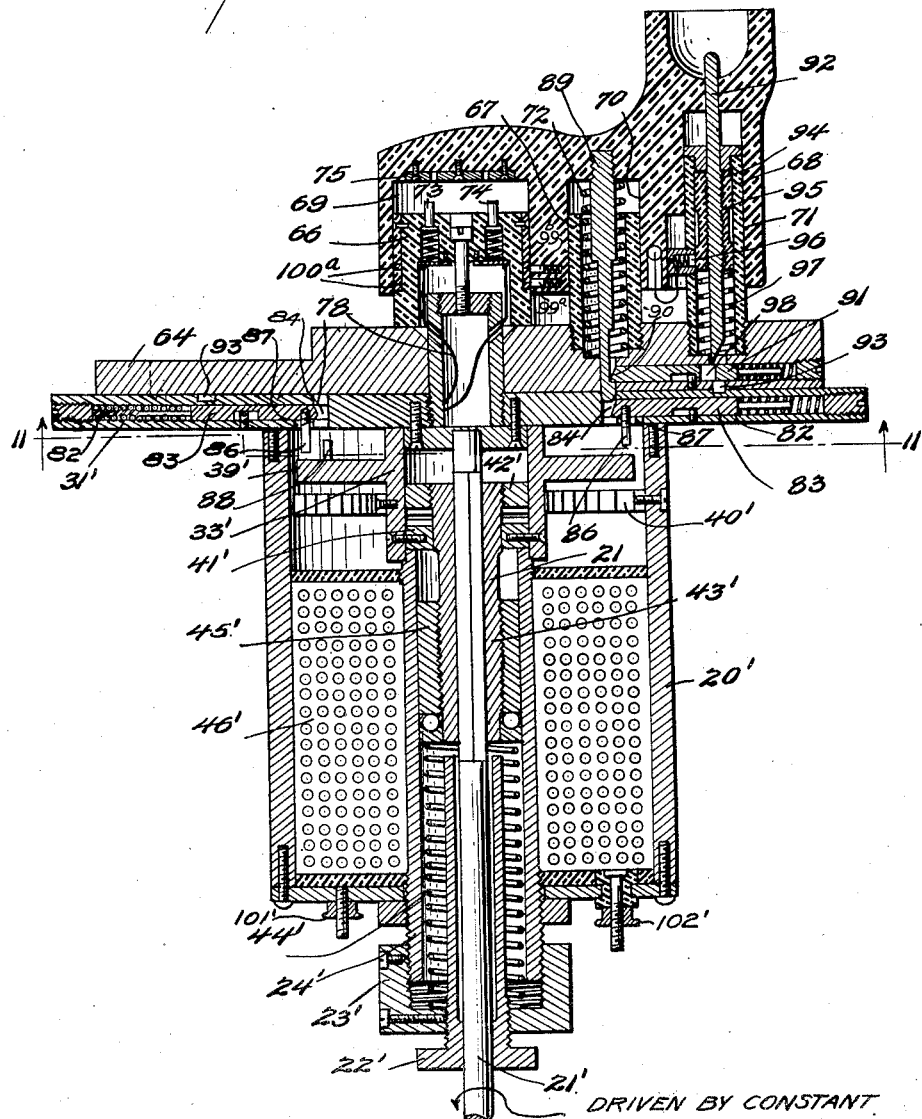

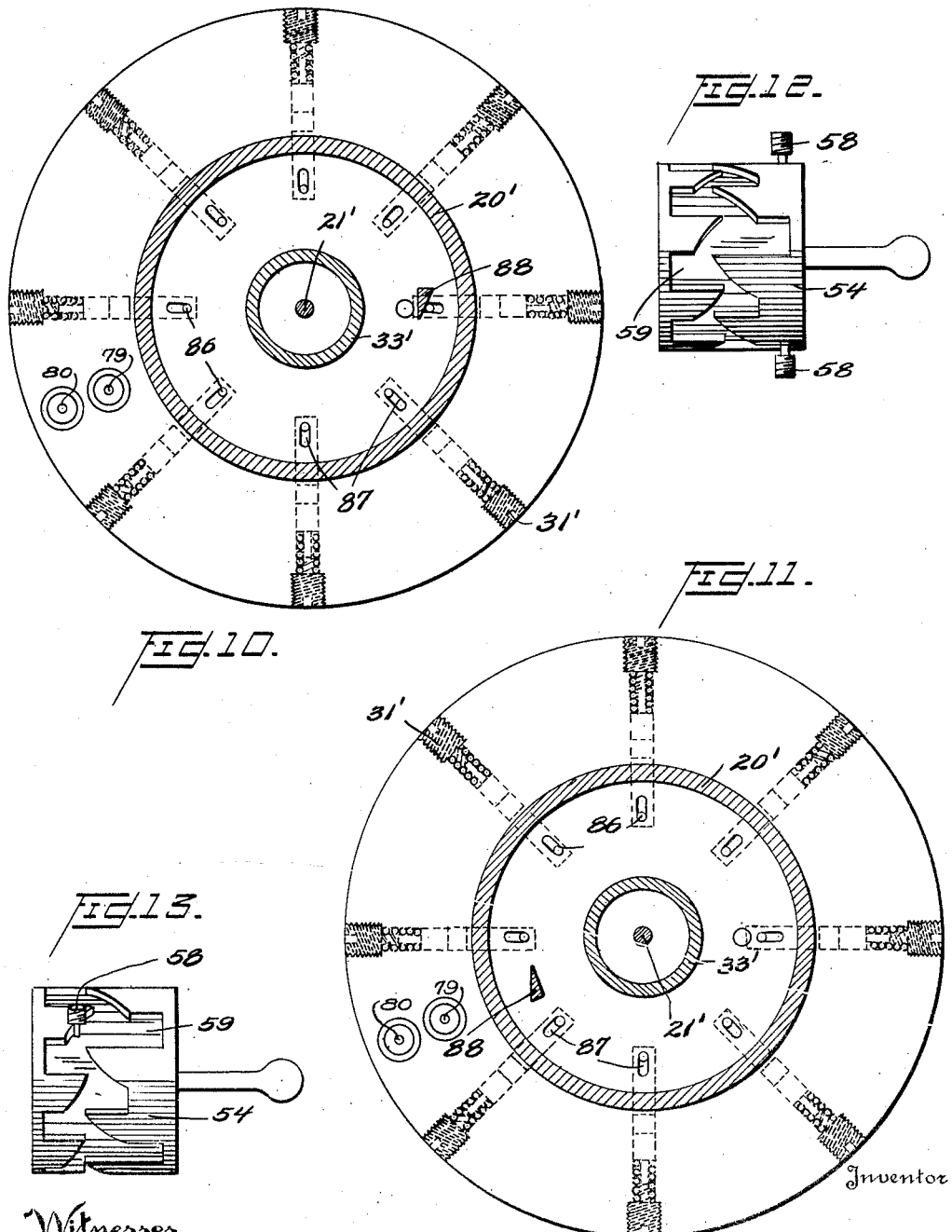

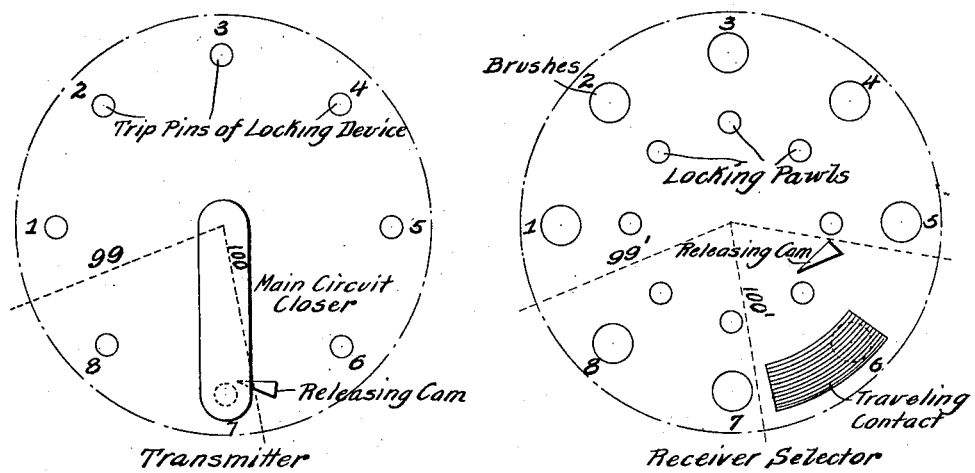
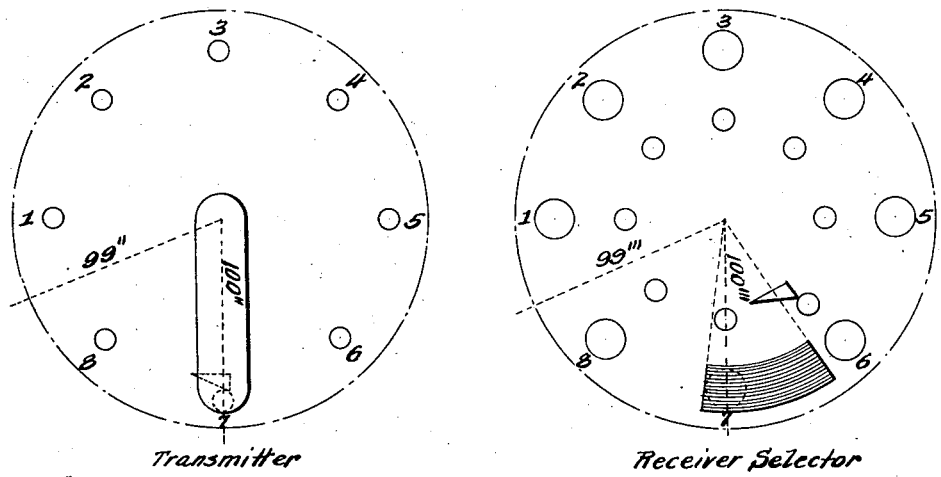

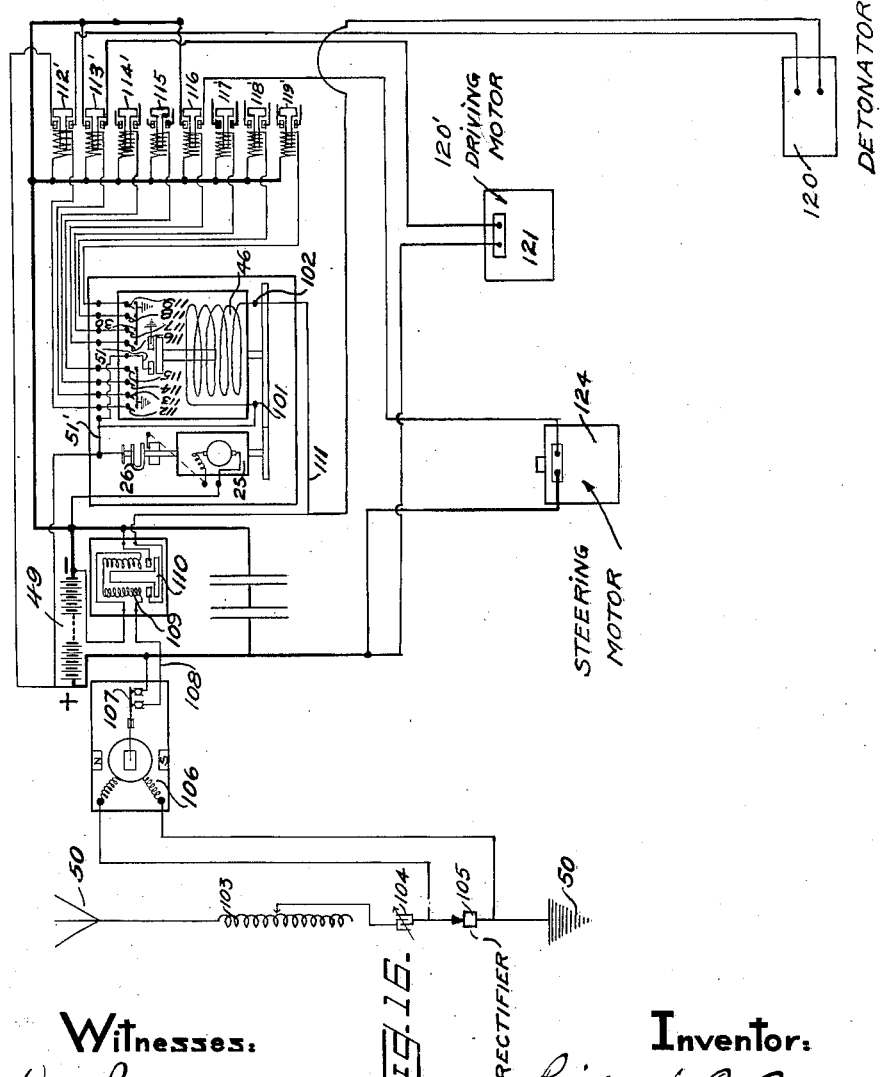

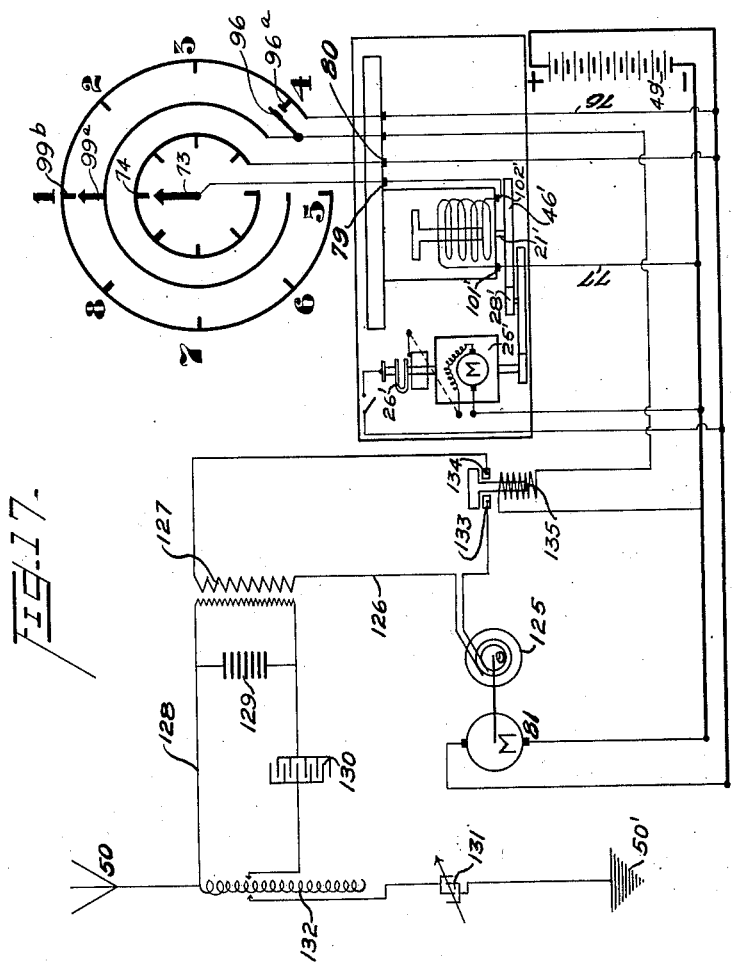

Patented Aug. 23, 1927.

1,639,987

UNITED STATES PATENT OFFICE.

RICHARD C. COUPLAND, OF THE UNITED STATES ARMY, DAYTON, OHIO.

ELECTRICAL CONTROL SYSTEM.

Application filed May 13, 1926. Serial No. 108,977.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment of any royalty thereon.

The invention relates to electrical control systems of the type wherein an operator at one place is enabled to exercise selective control over the several operating circuits of a group of electrical mechanisms at another location. It is especially applicable to radio control of torpedoes, bombs, ships, aircraft, tanks, and other self-propelled dirigible bodies.

In a system of radio control, each body to be controlled has its propulsion mechanism, steering gear, and other operating mechanisms electrically connected in a plurality of operating circuits. By closing and opening these circuits at will, the desired operating mechanisms may be started and stopped to control the actions of the body. It has been the practice, heretofore, to control the operating circuits selectively by means of a "selector" which is responsive to radio waves of different characteristics, or to various numerical combinations of impulses. The nature of the wave transmitted, or the number of impulses in a combination, has determined the particular operating circuit selected in each instance.

It is the primary object of the present invention to provide an improved system in which accurately timed, sustained impulses of varying duration are utilized for selective control of the operating circuits. The length of impulse determines the circuit selected.

In accomplishing this object, it is proposed to incorporate the transmitter proper of the transmitting apparatus of the system (described and claimed in co-pending application Ser. No. 108,976, filed May 13, 1926, and entitled Transmitter for electrical control systems of the selective type) in a time interval unit which includes a constant speed motor. The selector of the receiving apparatus likewise forms part of a time interval unit on board the body to be controlled, and is adapted to be driven by another constant speed motor. It is desirable that both motors shall operate at approximately the same rate of speed. The transmitter has a main circuit-closer by means of which a circuit may be closed manually to send out a selective or "starting" impulse. Means are provided for opening this circuit-closer automatically at a predetermined time after it has been closed. The circuit-closer opening mechanism is capable of being set for different time intervals, and is driven by the constant speed motor of the transmitter unit. The selector of the receiver unit constituting the principal subject matter of this application was described and claimed in my abandoned application Ser. No. 498,399, filed September 3, 1921, and entitled Electrical control systems relating to radio control of torpedoes, bombs, ships, etc. This selector has a travelling contact adapted to be driven by the constant speed motor of that unit. This contact traverses a series of contacts connected in the respective operating circuits.

The travelling contact is connected by means of a normally open circuit-closer in a common branch of all the operating circuits. Means responsive to a starting impulse sent out by the transmitting apparatus connects the travelling contact with the motor and maintains the connection until the impulse terminates. The length of impulse therefore determines the degree of advance of the selector contact and thus the particular operating circuit is partially closed at the moment the selector stops. The motors of both units are kept running continually, so the transmitter and selector attain full speed instantly. Upon cessation of the starting impulse, the circuit-closer of the selector is automatically closed to send current from a local source through the selected operating circuit, and means provided for the purpose checks the travelling contact. The transmitter has an auxiliary circuit-closer which may be closed manually to send out a second, "stopping" impulse. Means sensitive to this impulse in the selector unit opens the circuit-closer and thereby breaks the operating circuit.

Another object in view is to provide means for insuring accurate functioning on the part of the selector in spite of slight lag between it and the transmitter, which may occur by reason of variation in the relative speeds of the two driving motors. This provision makes it possible to use inexpensive commercial motors which are capable of operating at approximately the same speed, and also corrects for differences in inertia between the driven parts of the transmitter and those of the selector.

A further object is to provide a transmitter and a selector in which the driven parts automatically return to neutral position after each impulse. This feature insures reliability and precision of operation.

It is an object also to provide means for locking the main circuit-closer of the transmitter in closed position until termination of the "starting" impulse and until the "stopping" impulse has been sent out. This prevents the operator from "mixing his signals" and makes the transmitter "foolproof".

A still further object is to provide transmitter and selector units which are of a simple, strong construction and very compact, so as to occupy little space and to be reliable in operation under the most severe conditions on shipboard, and in other locations where they will be subjected to vibration, shock, and other disturbing influences. Each unit has a protective casing or housing which is capable of excluding moisture and dust. The construction is such, however, that access to the interior of the casing may be gained readily for the purpose of repair or adjustment of the interior mechanism.

Numerous other objects and advantages may become apparent as the following specific description is read in connection with the accompanying drawings, in which:

Fig. 1 is a side elevation of the selector of the receiving apparatus, showing a suitable type of constant speed prime-mover connected therewith;

Fig. 2 is a vertical cross section through the selector alone, showing the main selector drum operatively connected with the motor shaft;

Fig. 3 is a horizontal section on line 3—3 of Fig. 2, showing the secondary drum locked with its travelling contact touching one of the brushes;

Fig. 4 is a similar section on line 4—4 of Fig. 2, showing the releasing cam of the main drum as it is about to release the locking pawl corresponding in position to the next succeeding brush with respect to the one with which the travelling contact is in contact;

Fig. 5 is a side elevation of the transmitter, with prime-mover omitted, showing the main circuit-closer in wide-open position;

Fig. 6 is a vertical section through the transmitter, showing the releasing drum disconnected from the prime-mover and in neutral position;

Fig. 7 is a plan view of the transmitter, showing the circuit-closer fully closed for sending an impulse representing a definite position;

Fig. 8 is a vertical section on line 8—8 of Fig. 7, showing the drum operatively connected with the prime-mover and the releasing cam approaching the locking device with which the circuit-closer keeper is engaged;

Fig. 9 is a similar view showing the circuit-closer locked in intermediate position, with the releasing drum restored to neutral.

Fig. 10 is a horizontal section on line 10—10 of Fig. 8;

Fig. 11 is a similar view on line 11—11 of Fig. 9;

Fig. 12 is a side elevation of the clutch operating cam within the receiver illustrating the position of the cam followers with reference to the cam grooves after the receiver has been energized by a starting impulse;

Fig. 13 is a similar view illustrating the movement of the followers in the grooves of the clutch during a stopping impulse;

Fig. 14 is a diagrammatic view of the principal control elements of transmitter and selector, showing their relative positions at certain stages of operation;

Fig. 15 is a similar diagram, representing a subsequent stage;

Fig. 16 is a diagrammatic view of the receiving apparatus of the entire system, showing the wiring;

Fig. 17 is a similar view of the transmitting apparatus;

Fig. 18 is a section taken on the line 18—18 of Fig. 2 and illustrating the clutching means for retaining the rotary contact in fixed relation with respect to the stationary contacts; and Fig. 19 is a fragmentary elevation of the clutch members and their frame.

In the drawings, one embodiment of the invention is illustrated by way of example, but it is to be understood that it may be expressed in various other ways without departing from the scope of the appended claims. The improved control system is not to be restricted as to its application either. Besides use in radio control, it is suitable for wired circuits. Furthermore, there are arts other than the control of self-propelled, dirigible bodies in which it may be employed. For instance, it is suitable for the selective control of bell and annunciator circuits, or for use in the control of automatic sub-stations in railway propulsion systems. These are only a few instances out of many which could be cited.

In describing the details of construction which have been adapted for the purpose of illustration, the receiver time interval unit will first be considered. Referring to Figs. 1 to 4 inclusive, the numeral (20) designates the casing, or housing, of the selector. The casing is shown mounted with its longitudinal axis vertical, but other positions might be assumed instead. It is not necessary to make the casing cylindrical in form either. It is chiefly for the sake of compactness that this form has been chosen.

A drive shaft (21) enters the casing and is journalled in bearing (22), which is in the form of an adjustable bushing in threaded engagement with a cap (23) attached to the protruding end of a large tube (24). This tube extends into the casing for a considerable distance and is preferably disposed concentric to the axis of the latter. The shaft (21) may be connected to any suitable prime-mover, such as the motor (25) shown in Fig. 1. A governor (26) may be employed to maintain constant speed. By connecting the motor shaft (27) to the drive shaft (21) through the medium of speed reducing gears (28), having a gear ratio of 1:200, the motor may be operated at 1200 R. P. M. for a drive shaft speed of 6 R. P. M. Speed as low as this for the drive shaft is quite desirable, as will be explained hereinafter.

While the receiver under consideration may be utilized to control the steering propulsion or similar mechanism of a vessel, airship, torpedo and the like, in the present embodiment for descriptive purposes it is illustrated in connection with a torpedo, and consequently eight contacts are employed, numbered 112 to 119 respectively, which correspond to the various mechanisms requisite to the proper manipulation and detonation of a torpedo. The contacts 112 to 119 inclusive are in the form of spring pressed plungers mounted in suitable terminals carried by end plate (31) and arranged for brushing engagement by a single contact (30) mounted on a rotatable drum (32) hereinafter to be described, so that as the drum is actuated a step-by-step engagement of the rotary contact with the fixed contacts is obtained.

The several contacts 112 to 119 are provided with a common return in the form of a plunger (51) yieldably mounted in a tubular terminal (52) positioned in end plate (31). Electrical contact between the common return (51) and the contacts 112 to 119 inclusive is obtained through the metallic parts of the primary and secondary drums and the contact (30) which is in engagement with the secondary drum (32) as clearly shown in Fig. 2 of the drawings. Drum (32) is rotatably supported on a main drum (33), which is rotatably mounted in the casing in prolongation of the tube (24). The lower end of the main drum is open and in direct communication with the tube.

Drum (32), which will be called the "secondary" drum to distinguish it from the main drum, is connected to the main drum for rotation therewith by a coil spring (34). Drum (32) is provided with an annular offset the latter having a tooth (35) located immediately opposite the contact (30) for successive engagement with each of a series of spring-pressed locking pawls (36) mounted on a flange (37) projecting inward from the casing. There are eight pawls, one for each brush (29), and they are situated directly beneath their respective brushes. Each pawl is adapted, when in engagement with the drum tooth (35), to lock the secondary drum against movement in the direction in which the main drum is driven. (See arrow in Figs. 3 and 4.) It is intended that the secondary drum shall be locked only temporarily between steps of the advance of contact (30) from brush to brush.

In order to release the secondary drum at the proper time, a releasing cam (38) projects from a flange (39) on the main drum for engagement with each locking pawl in turn as the drum rotates. When the cam strikes a pawl, it shifts the latter momentarily into inoperative position to clear the tooth (35). This permits the secondary drum to catch up with the main drum before it becomes checked again by the next succeeding pawl.

A coil spring (40) connects the main drum with the casing. This spring is placed under tension when the main drum is rotated, and serves as means for returning the drum to a neutral position at the end of its travel. Comparatively massive stops (32') and (33') on drums (32) and (33), respectively, check drum (32) when released. Impact between these stops will occur before tooth (35) strikes the next pawl, so drum (32) will move slowly with drum (33) the rest of the way, bringing tooth (35) gently into contact with the pawl.

Means for connecting the main drum operatively with the drive shaft (21) will now be described. Co-acting clutch members (41) and (42) are disposed within the primary drum, one of said clutch members being affixed to the drum the other being carried by a sleeve (43) hereinafter to be referred to. The end of shaft (21) is squared and fits within the sleeve (43), which is internally squared correspondingly. The sleeve is therefore free for sliding movement on the shaft but is held against rotation thereon. The lower end of sleeve (43) is adapted to abut the upper end of bushing (22) when the clutch members are engaged. The bushing serves as a stop for the sleeve, and is capable of regulating the degree of thrust of the latter, due to its adjustability. A compression spring (44) tends to maintain the clutch members out of engagement with each other. This spring is interposed between the casing cap (23) and a solenoid core (45), which is fixedly secured to sleeve (43) and slides inside tube (24). The tube

(24) is encircled by a solenoid (46), which when energized retracts clutch member (42) and engages it with clutch member (41) whereupon the rotary movement of shaft (21) is transmitted to the primary drum as will be understood without further discussion.

A cam member (54) of metal is attached by a metallic stem (55) to sleeve (43). The stem is swiveled in the sleeve to permit relative movement between cam and sleeve. The cam member (54) is housed within an annulus (56) which projects into the interior of the primary drum and constitutes a continuation of annular frame (57). This frame closes the open end of the primary drum and is fixedly secured to the end plate (31) of the casing. Annulus (56) within the primary drum is provided (see Fig. 12) at diametrically opposite points with cam followers (58) designed to operate in the cam grooves (59). These grooves (59) are intercommunicating and disposed circumferentially of the cam surface and are of two lengths alternately arranged (see Figs. 12 and 13), so that the followers (58) when longitudinally operated travel from a short to a long groove and inversely to partially rotate the cam member (54).

Normally follower (58) is situated in one of the short length grooves to hold the cam (54) in disengaged relation with respect to the plunger contact (51). When however, the solenoid (46) is energized, the cam member (54), by virtue of its connection with core (45) is drawn inwardly, and this movement causes the followers (58) bearing against the inclined edges (59) of the cam grooves to impart a partial revolution to the cam, thus positioning the long grooves for reception of the followers (58) on deenergization of the solenoid. The grooves of greater length in cam (54) permit said cam on its return to engage the plunger of contact (51), while the shorter grooves of the cam maintain the plunger and cam in spaced relation as previously stated.

When the cam member strikes plunger (51), it brings the contact (30) into electrical connection with the plunger through the metallic parts of the internal mechanism. In order that brushes (29) will not touch the metallic drum (32) when they are not bearing against contact (30), a facing (60) of insulating material forms an annular track extending from one side of the contact clear around the drum to the other side.

A second clutch is provided to secure the main drum automatically against return to neutral position upon termination of each starting impulse. This clutch comprises coacting members (61) and (62) which are attached to the drum and to frame (57), respectively. The clutch members (62) are preferably in the form of an annular series of levers pivoted in the frame (57) and formed with suitable clutch faces for cooperation with the clutch face of member (61).

These radially extending clutch members (62) are arranged to co-act with a shoulder on the plunger of contact (51) so that as the plunger is forced upwardly by the cam (54), the members (62) will be brought into clutching relation with the clutch member (61) as is clearly shown in Figs. 2, 18 and 19 of the drawings.

Having described the structural details of the receiver it is deemed advisable at this point to consider the electrical circuits through the instrumentality of which the receiver mechanism is caused to function.

Reference being had to Fig. 16 of the drawing it will be apparent when the antennae circuit including antennae (50), variable inductance (103), variable capacity (104), rectifier (105) and ground (50') receives a radio impulse, the polarized relay (106) will be energized to close switch (107) and complete the local circuit (108) of battery (49) or other sources of electrical energy. The local circuit (108) includes a solenoid (109) which when energized closes switch (110) and completes circuit (111), including solenoid (46). Energization of solenoid (46), as above stated, places the contact (30), in engagement with one of the contacts 112 to 119 inclusive, each of which is connected to one side of a correspondingly numbered relay switch, the other side of which is connected with the negative pole of battery (49).

The positive pole of battery (49) is connected with the contacts 112 to 119 inclusive, through common return (51'), contact plunger (51) and rotary contact (30). Arranging the circuits in this manner, it is apparent when the rotary contact (30) is in engagement with one of the fixed contacts 112 to 119, the correspondingly numbered relays will be energized.

Although various instrumentalities might manifestly be controlled by the solenoid switches 112' to 119' inclusive, for descriptive purposes only certain of the torpedo components are diagrammatically shown such as a detonator (120), a steering motor (124), and a driving mechanism (121).

The remaining relay switches might include circuits governing the steering and gyroscopic apparatus, but as these elements and mechanisms are not essential to the present invention they have not been shown. As previously stated the receiver is suitably geared to a constant speed motor (25) controlled by governor (26), the motor being included in the circuit of battery (49) as clearly shown.

Before describing the operation of the receiver unit more fully, the structural details of the transmitter unit will be specified. On this unit the drive shaft (21') is connected to a constant speed prime-mover (not shown) similar to that disclosed in Fig. 1. The gear ratio is the same, so 6 R. P. M. will be developed in shaft (21'). The bushing (22'), cap (23'), tube (24'), drum (33'), flange (39'), return spring (40'), clutch members (41') and (42'), sleeve (43'), solenoid spring (44'), core (45'), and solenoid coil (46'), are all similar to the correspondingly numbered parts of the selector.

The cover plate (31') of casing (20'), in this instance, is enlarged and bears an indicator scale (63) around its marginal edge. This scale is graduated in terms of the different operations to be selectively controlled. The cover plate therefore constitutes an indicator dial. A co-related indicator disk (64) of less diameter than the cover plate is pivotally mounted on the latter and bears an indicator mark, such as arrow (65), adapted to traverse scale (63). (See Fig. 7). A control handle (64ᵃ) is mounted on disk (64) and acts as means by which the disk may be turned upon its pivotal axis. The handle is preferably made of insulating material and is mounted for limited axial movement on the disk. It is guided in this movement by three tubular bearing members (66), (67) and (68) of insulating material, which are arranged in a radial row on the disk and which project into bearing sockets (69), (70) and (71), respectively, in the handle. A compression spring (72) normally maintains the handle in the fully raised position of Figs. 5 and 6.

The control handle serves as the movable member of a main circuit-closer. For this purpose, two spring-pressed contacts (73) and (74) may be mounted in bearing member (66). A wide contact plate (75) carried by handle (64ᵃ) and disposed in socket (69) is adapted to bridge the contacts (73) and (74) when the handle is depressed into the circuit closing position of Figs. 7 and 8. The contacts (73) and (74) are connected by suitable conductors with the terminals (79) and (80) of the transmitter for a purpose to be hereinafter specified.

In order to lock the main circuit-closer in closed position for a predetermined length of time, a plurality of locking devices (82) are provided in the plate (31'). These devices are arranged in an annular row around the pivot of disk (64) and correspond in position to the several operation control points represented by scale (63). There are thus eight locking devices and each is located directly beneath one of the graduations of the scale and corresponds to the indicated contact of the receiver or selector.

Each locking device includes a bolt (83) mounted for radial movement and normally having its inner end projecting into an axially extending opening (84) formed in plate (31') as clearly shown in Fig. 6 of the drawing. A spring (85) tends to maintain the bolt in this operative position. A trip pin (86) projects downward from the bolt through a limiting slot (87) in the plate into casing (20'). A releasing cam (88) carried by drum flange (39') is adapted to engage the trip pins of all the locking devices in succession, during rotation of the drum, and is capable of forcing each pin laterally until the corresponding bolt is in inoperative position, wherein its engaging end clears the socket (84).

A keeper (89) in the form of a pin is secured to handle (64ᵃ) and extends downward through socket (70), bearing member (67), opening (90) in disk (64) and into axially extending opening (84) of the locking devices. The keeper has a shoulder near its end for engagement with the bolt of the selected locking device, in each instance. The end of the keeper and the engaging end of each bolt are beveled to afford camming action, whereby the keeper will force its way past the bolt and into locking position, when the handle (65) is depressed in any selected position with reference to the indicator. When the keeper is thus engaged with the bolt, the handle will become securely locked in closed position.

An additional locking device (91) is positioned in disk (64) for engagement with the keeper (89) to secure the handle in partially open position, as shown in Fig. 9. A releasing pin (92) is adjustably mounted in the control handle and projects through socket (71) and bearing member (68) into opening (93) in disk (64). A circuit-closing member (94) is attached to pin (92) and slides in bearing member (68). This member (94) has a contact band (95) adapted to bear against adjacently located spring pressed contacts (96) and (96ᵃ) in the control handle when the releasing pin is depressed to its fullest extent. When the contacts (96) and (96ᵃ) are bridged by band (95) a circuit, hereinafter to be described, is completed through the instrumentality of which an impulse of momentary duration is produced, which may be referred to as a stopping impulse as it disengages the secondary drum of the receiver and permits its return to normal position.

A spring (97) tends to maintain the pin (92) in its elevated, inoperative position. The lower end of the releasing pin is beveled to provide a cam surface, which upon entering opening (98) in the bolt forces the latter back into inoperative position so as to release the pin (89). Releasement of this pin permits the control handle to rise into fully open position, wherein it can be adjusted to some other desired operating position around the indicator dial.

The mechanical features of the transmitter having been shown and described the transmitting and other circuits controlled thereby are shown in Fig. 17 of the drawings.

Reference being had to this figure it will be apparent the transmitter includes a broadcasting apparatus of conventional design including motor (81), generator (125), primary circuit (126) including primary and secondary coils (127), secondary circuit (128), (having the usual quenched spark gap (129), condenser (130)) and an antennæ circuit embodying antennæ (50), variable inductance (132), variable capacity (131) and ground (50'). All of the preceding structure being conventional it is referred to merely for descriptive purposes. The primary circuit (126) of the transmitting apparatus includes contacts (133) and (134) adapted to be bridged by the contact switch of relay (135). By virtue of this arrangement, energization of relay (135) closes the primary circuit of the transmitting apparatus and effects energization of the antennæ circuit hereinbefore referred to.

One side of relay (135) is connected to the negative pole of battery (49) while the other side is connected to contacts (96) and (99ª) of the transmitting apparatus. Contact (99ª) coacts with contact (99ᵇ) and contact (96) cooperates with contact (96ª). The contacts (99ᵇ) and (96ª) are connected to the positive side of battery (49'). When contacts (99ª) and (99ᵇ) likewise contacts (96) and (96ª) are brought into contact the relay (135) will be energized by battery (49') to close the primary circuit of the transmitting apparatus and thus permit energization of the antennæ circuit. To effect energization of the solenoid (46') of the transmitter, one of its terminals (102') is connected to terminal (79) which in turn is suitably connected with contact (73) interior of the transmitter. Contact (73) cooperates with contact (74) which is connected through terminal (80) to the positive side of the battery (49'). The negative side of the battery is connected by a conductor (77) with the terminal (101) of the solenoid (46'). With this circuit arrangement it is evident when contacts (73) and (74) are brought into engagement, solenoid (46') and relay (135) will be simultaneously energized for the purpose hereinbefore explained.

The operation of the system will now be described. Assuming that the control handle of the transmitter is in the wide-open position shown in Figs. 5 and 6, and that it is desired to close a certain operating circuit at the receiving end of the system, the handle is first moved around to the position indicated by the dial as representing the operation in mind. The handle is then pressed down so far as it will go. This action results in locking of the handle, closing of the main circuit-closer, energization of the solenoid, and shifting of the clutch into operation. Since the drive shaft is continually rotating at constant speed, the releasing drum will attain this speed instantly and rotate slowly from neutral position until cam (88) has reached the trip pin of the particular locking device which is in engagement with keeper (89).

At this point, the cam will shift the pin and release the locking device, whereupon the control handle will rise to the intermediate position, in which it becomes locked by the disk-carried locking device. While the drum is turning from neutral to releasing position, an electrical impulse (in this case a radio impulse) will be going to the receiving apparatus. The angular distance between neutral position and the selected locking device, and the speed of rotation of the drum, determine the length of impulse. This is the "starting" impulse, which causes step-by-step advance of the selector or receiver drum at the other end of the system.

The operator cannot "mix his signals", because the control handle cannot be moved during the sending of the starting impulse, nor can it be shifted to a new operating position at the end of that impulse without first depressing the member (92) to send out a short "stopping" impulse. The operator waits before sending the stopping impulse until the desired operation of the torpedo, or other device controlled thereby has continued for a sufficient length of time.

At the receiving end of the system, the operation is as follows: Energization of the selector solenoid (46), through the indirect influence of the starting impulse, causes the main clutch to be closed. The main drum comes into instant operation and rotates at the same speed as the releasing drum of the transmitter from neutral position.

The secondary drum moves with the main drum until its contact (30) covers the first contact brush (29). In this position it is locked by one of the pawls (36). The main drum advances steadily, and when its cam (38) engages the locking pawl which is holding the secondary drum, the latter will be released and permitted to overtake the main drum. It is thrown forward until stop (32') strikes stop (33') then moves slowly with the main drum until tooth (35) engages the next pawl (36), when ordinarily, upon engagement of stop (32') with stop (33'), the leading edge of travelling contact (30) will touch the next brush (29).

From this stage until the secondary drum is completely checked, contact (30) will slowly rub against the brush and probably come to rest with its trailing edge on the brush. The secondary drum therefore lags behind the main drum through an angle of 45° (with eight contact brushes) at each stop. This action is desired in order that the travelling contact (30) shall reach the final contact brush and stop there, in spite of any variations in speed of the two prime-movers. By making contact (30) in the form of a segment extending through 35°, for instance, and by making each contact brush about 3/8" in diameter, the action just mentioned is assured. In Figs. 14 and 15, this operation is represented graphically.

Referring first to Fig. 14, doted lines 99 and 99' of the transmitter and selector diagrams, respectively, represent the neutral position of an imaginary plane passing axially through the transmitter drum and main drum of the selector. Dotted lines 100 and 100' designate the positions of these respective planes when the transmitter is set for an operation which may be termed "operation No. 7", and when the main selector drum has just about reached the ends of its travel. The segmental contact of the secondary selector drum is shown locked with its trailing edge on the brush contact representing "operation No. 6".

In Fig. 15, the plane 100" of the transmitter is represented at the moment the drum has reached the end of its travel. Coincidentally the plane 100''', of the selector has reached the brush contact of "operation No. 7". The locking pawl adjacent to the brush contact of "operation No. 6" has been tripped and contact (30) has jumped forward to the selected brush contact.

From these diagrams it is apparent that before the signal impulse has been terminated by the transmitter a 35° error between the position of the transmitter drum and main selector drum will be taken care of by virtue of the length of contact (30). Furthermore as the secondary drum is held back for engagement by the releasing cam for an interval corresponding to approximately 45° angular travel of the main drum, a correction will be provided for a total error of about 80° which represents 80/360 of one revoluation of the drive shaft or 8/36 of 200 revolutions in the case of the prime-mover shaft.

This equals 44.4 revolutions. From this it follows that there must be an error of 44.4 R. P. M. in the speeds of the two-prime movers before an error will be introduced in the system which will effect proper functioning of the selector. Because of this fact, it is possible to utilize small, fractional horsepower, series, direct current motors for prime-movers, and to control their speed by means of make-and-break governors well within the required range of speed.

To continue with the operation of the selector, when the travelling contact has reached the selected brush contact, the starting impulse will have terminated, and the main clutch will have been thrown open. Sudden expansion of spring (44) forces cam member (54) upward its full throw in time to close the additional clutch and lock the main drum before it can return to neutral position. That leaves contact (30) on the selected contact (29). At the same time the selected operating circuit has been completed through plunger contact (51), cam member (54), frame (57), and drums (33) and (32) to the said brush contact (29). Until the selector is restored to normal, the current will continue to flow in this circuit. When the short stopping impulse is received and causes energization of the solenoid, however, cam member (54) descends and the additional clutch is opened. Owing to the construction of the cam slot, member (54) will not rise high enough to strike plunger (51) at the end of the impulse, so both drums are free to return to neutral position.

Descent of plunger (51) to its lowermost position, which effected release of the clutch members (61) and (62) at the same time broke the operating circuit. The selector is now in condition for any subsequent starting impulse.

Having described my invention, what I claim as new and wish to secure by Letters Patent is:

1. In a system of electrical control, a receiving apparatus comprising relatively movable primary and secondary members, resilient means connecting the said members for simultaneous operation, impulse-responsive means and means controlled thereby for moving the primary member at a constant rate during the duration of the impulse, a travelling contact carried by the secondary member, a plurality of stationary contacts adapted to be traversed by the travelling contact, means for locking the secondary member upon arrival at each stationary contact, and means controlled by the primary member for releasing the secondary member at the termination of a predetermined amount of travel of the primary member after the travelling contact has become locked in contact with each stationary contact.

2. In a system of electrical control, a receiving apparatus comprising relatively movable primary and secondary members, resilient means connecting the said members for simultaneous operation, impulse-responsive means and means controlled thereby for moving the primary member at a constant rate during the duration of the impulse, a travelling contact carried by the secondary member, a plurality of stationary contacts adapted to be traversed by the travelling contact, means for locking the secondary member upon arrival at each stationary contact, and means controlled by the primary member for releasing the secondary member at the termination of a predetermined amount of travel of the primary member after the travelling contact has become locked in contact with each stationary contact.

3. In a system of electrical control, a receiving apparatus comprising relatively movable primary and secondary members, resilient means connecting the said members for simultaneous operation, impulse-responsive means and means controlled thereby for moving the primary member at a constant rate during the duration of the impulse, a travelling contact carried by the secondary member, a plurality of stationary contacts adapted to be traversed by the travelling contact, means for locking the secondary member upon arrival at each stationary contact, and means controlled by the primary member for releasing the secondary member at the termination of a predetermined amount of travel of the primary member after the travelling contact has become locked in contact with each stationary contact.

4. In a system of electrical control, a receiving apparatus comprising relatively movable primary and secondary members, resilient means connecting the said members together for simultaneous operation, impulse-responsive means and means controlled thereby for moving the primary member at a constant rate during the duration of the impulse, a travelling contact carried by the secondary member, a plurality of evenly spaced stationary contacts adapted to be traversed by the travelling contact, the travelling contact being nearly equal in extent to the space between stationary contacts, means for locking the secondary member upon arrival at each stationary contact and means controlled by the primary member for releasing the secondary member at the termination of a predetermined amount of travel of the primary member after the travelling contact has become locked in contact with each stationary contact.

5. In a system of electrical control, a receiving apparatus comprising relatively movable primary and secondary members, resilient means connecting the said members together for simultaneous operation, impulse-responsive means and means controlled thereby for moving the primary member at a constant rate during the duration of the impulse, a travelling contact carried by the secondary member, a plurality of evenly spaced stationary contacts adapted to be traversed by the travelling contact, the travelling contact being nearly equal in extent to the space between the stationary contacts, means for locking the secondary member upon arrival at each stationary contact and means controlled by the primary member for releasing the secondary member at the termination of a predetermined amount of travel of the primary member after the travelling contact has become locked in contact with each stationary contact.

6. In a system of electrical control, a receiving apparatus comprising two relatively movable primary and secondary members, resilient means connecting the said members together for simultaneous operation, impulse-responsive means and means controlled thereby for moving the primary member at a constant rate during the duration of the impulse, a travelling contact carried by the secondary member, a plurality of evenly spaced stationary contacts adapted to be traversed by the travelling contact, the travelling contact being nearly equal in extent to the space between the stationary contacts, means for locking the secondary member upon arrival at each stationary contact and means controlled by the primary member for releasing the secondary member at the termination of a predetermined amount of travel of the primary member after the travelling contact has become locked in contact with each stationary contact.

7. In a system of electrical control a receiving apparatus comprising two relatively movable members, resilient means connecting the said members together for simultaneous operation, impulse-responsive means for moving one of the said members, a travelling contact carried by the other movable member, a plurality of evenly spaced stationary contacts adapted to be traversed by the travelling contact, the said travelling contact being nearly equal in extent to the space between stationary contacts, means for locking the member bearing the travelling contact upon arrival at each stationary contact, and means for releasing the last-mentioned member each time the other member has reached a position in lead of it approximately a distance equal to the space between stationary contacts.

8. A receiving apparatus of the selective type comprising an electro-responsive means, a selector mechanism embodying a series of fixed and a rotary contact, actuating mechanism co-acting with the rotary contact to effect its progressive advancement over the fixed contacts, retarding means engaging the rotary contact at each of the fixed contacts, releasing means carried by the actuating mechanism and co-operating with the retarding device to disengage the latter, and means controlled by the electro-responsive means and interconnecting, the actuating mechanism with the rotary contact for a period determined by the duration of the impulse influencing the electro-responsive means.

RICHARD C. COUPLAND